Oct. 30, 1934.　　　　S. G. ECKLUND　　　　1,978,573
GROUND COFFEE MACHINERY
Filed June 23, 1932　　　7 Sheets-Sheet 1

Witness:
R. F. Rohlfing

Inventor
S. G. Ecklund
By Arthur H. Sturges
Attorney

Oct. 30, 1934.  S. G. ECKLUND  1,978,573
GROUND COFFEE MACHINERY
Filed June 23, 1932  7 Sheets-Sheet 2

Inventor
S.G.Ecklund
By Arthur H. Sturges
Attorney

Witness:
R. F. Rohlfing

Oct. 30, 1934.  S. G. ECKLUND  1,978,573
GROUND COFFEE MACHINERY
Filed June 23, 1932   7 Sheets-Sheet 3

Witness:
R. F. Rohlfing

Inventor
S. G. Ecklund
By Arthur H. Sturges
Attorney

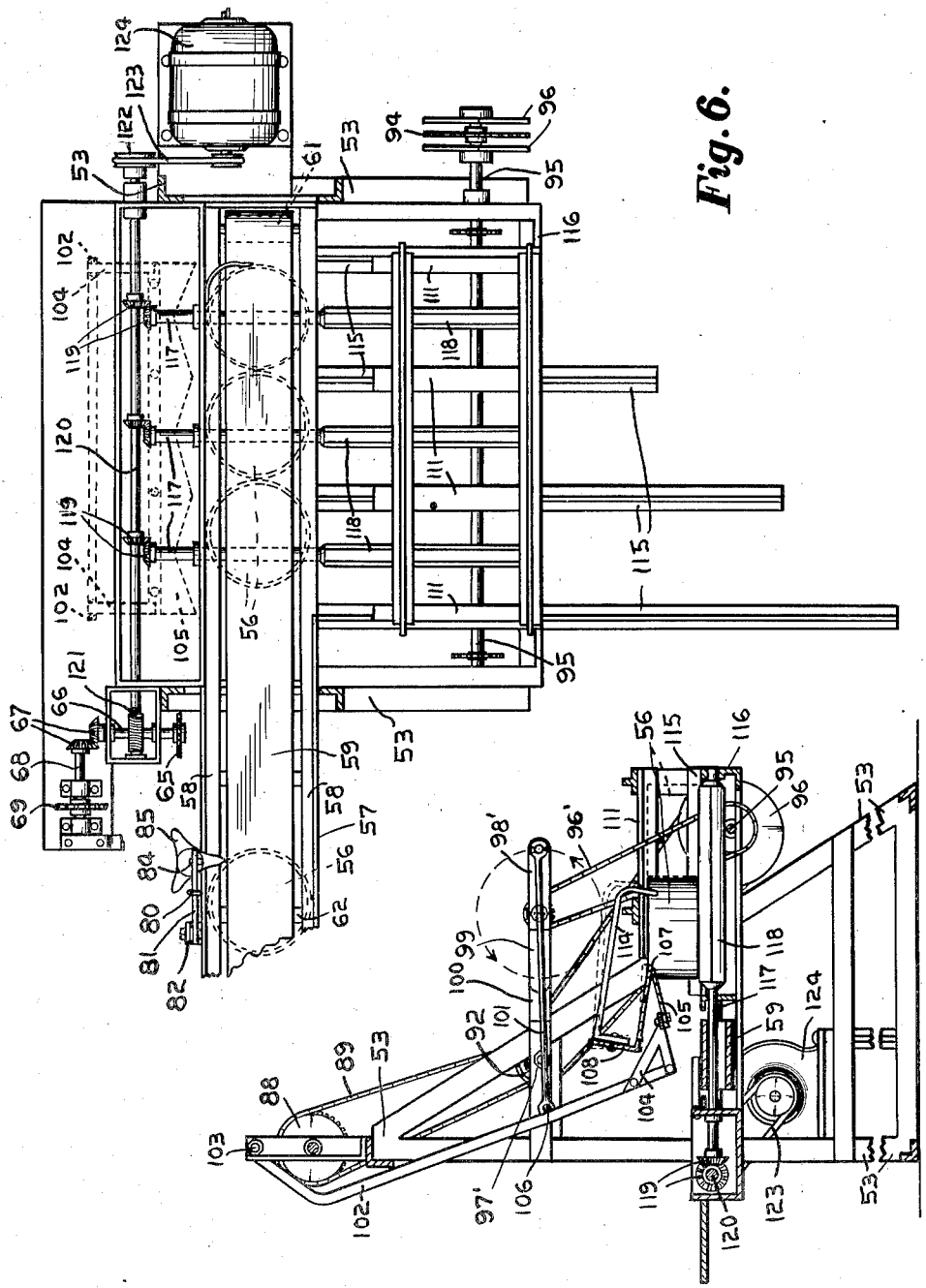

Oct. 30, 1934.  S. G. ECKLUND  1,978,573

GROUND COFFEE MACHINERY

Filed June 23, 1932  7 Sheets-Sheet 5

Witness:
R. F. Pohlfing

Inventor
S.G.Ecklund
By Arthur H. Sturges
Attorney

Oct. 30, 1934.  S. G. ECKLUND  1,978,573
GROUND COFFEE MACHINERY
Filed June 23, 1932  7 Sheets-Sheet 6
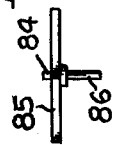
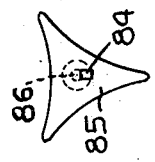
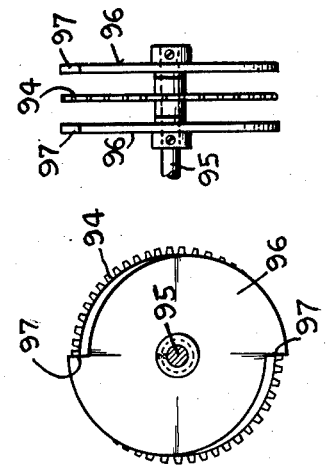
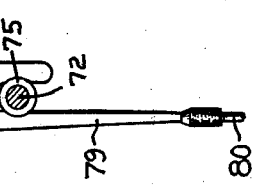
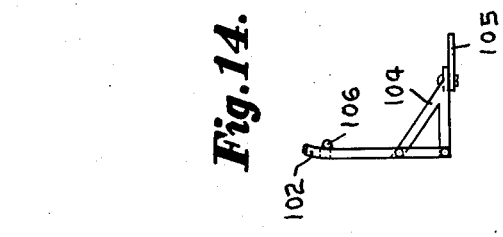
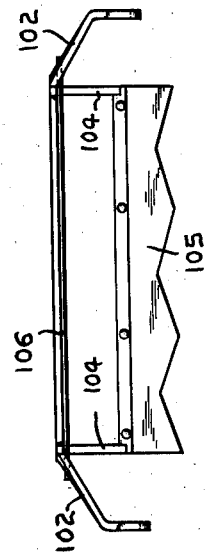
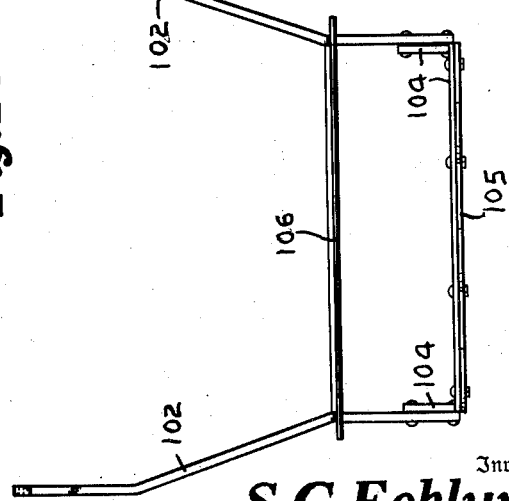
Inventor
S. G. Ecklund
By Arthur H. Sturges
Attorney
Witness:
R. F. Rohlfing Oct. 30, 1934.  S. G. ECKLUND  1,978,573
GROUND COFFEE MACHINERY
Filed June 23, 1932  7 Sheets-Sheet 7
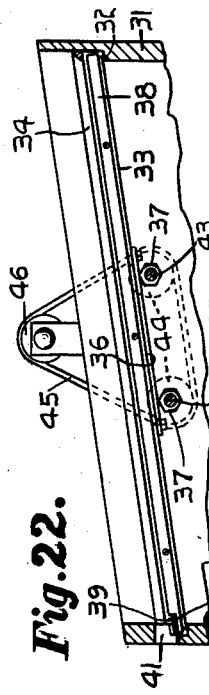
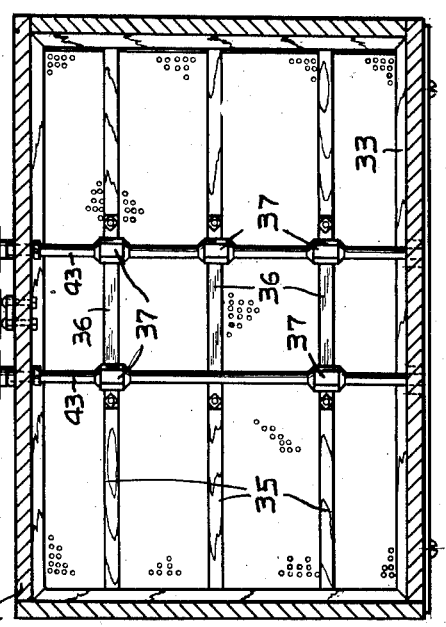
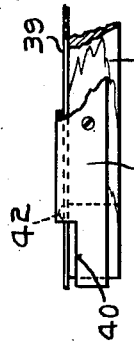
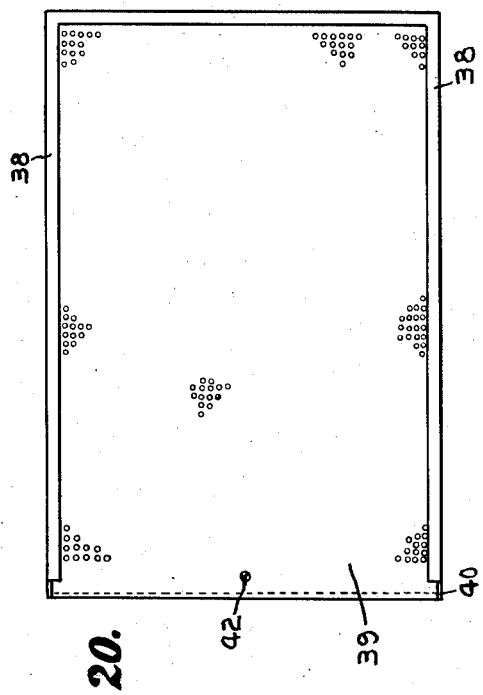
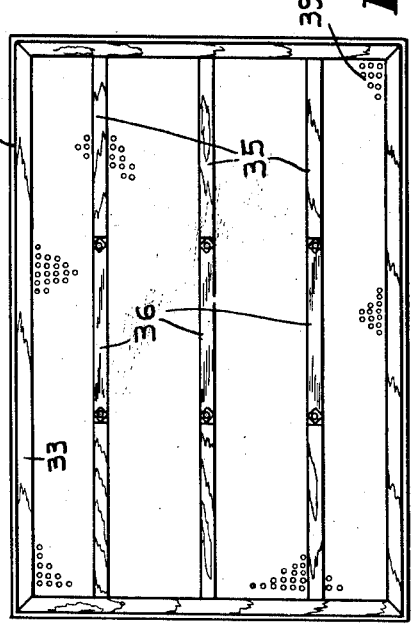
Inventor
S.G.Ecklund
By Arthur H. Sturges
Attorney
Witness:
R. F. Rohlfing Patented Oct. 30, 1934

1,978,573

UNITED STATES PATENT OFFICE 1,978,573

GROUND COFFEE MACHINERY

Sixten G. Ecklund, Omaha, Nebr.

Application June 23, 1932, Serial No. 618,907

4 Claims. (Cl. 226—72)

The present invention relates to an improved machine for screening, handling and canning coffee, and has for one of its objects to provide an improved screening or separating device for passing ground coffee of uniform size to the handling and canning portions of the machine and for separating the chaff and the like therefrom and returning the coarser particles of coffee for re-grinding.

Another object of the present invention is to provide an improved construction of agitating means not only for the screen but for the cans or containers for the coffee to agitate the screen and to cause the settling of the coffee in the cans so as to uniformly pack the same and admit of the proper filling of the cans.

The invention also aims to provide improved means for feeding cans into position to receive the coffee and wherein the can operating means may operate continuously and simultaneously with the sifting or screening device so that the operation of the machine is substantially continuous with a continuous feed of cans into and through machines and a continuous feeding of the coffee into the machine and into the cans.

The invention also has for an object to provide a construction of coffee canning machine wherein suitable measuring devices may be employed if desired; wherein the cans are completely filled without spilling the coffee by an improved construction of can agitating means; wherein improved means is provided for delivering the coffee from chutes and moving cans beneath the chutes, the construction being such as to admit of the simultaneous feeding and filling of a plurality of cans so that the output of the machine is relatively large.

With the foregoing and other objects in view, the invention will be more fully described hereinafter, and will be more particularly pointed out in the claims appended hereto.

In the drawings, wherein like symbols refer to like or corresponding parts throughout the several views.

Figure 5 is a transverse section taken through the machine substantially on the line 5—5 of Figure 1 and looking in the direction of the arrows.

Figure 6 is a horizontal section taken through the lower portion of the machine taken on the line 6—6 of Figure 1.

Figure 12 is a detail top plan view of the can sweep for moving a plurality of cans into position for filling from the conveyor belt.

Figure 13 is a front elevation of the same.

Figure 14 is a fragmentary lower end view thereof, looking toward the edge of the sweep.

Figure 15 is a detail fragmentary view of the trip employed for releasing cans on the feed belt into the machine.

Figure 16 is a detail side elevation of the can retaining device controlled by the trip of Figure 15.

Figure 17 is a top plan view of the same.

Figure 18 is a detail side elevation of the ratchet structure employed for intermittently operating the sweep.

Figure 19 is an edge view thereof.

Figure 20 is a detail top plan view of the screen and its frame.

Figure 21 is a bottom plan view of the same.

Figure 22 is a detail fragmentary view through the screen casing with the frame and agitator therein.

Figure 23 is a bottom plan view of the same, and

Figure 24 is a fragmentary enlarged sectional view taken through a portion of the screen frame, showing the means for slidably supporting the screen therein.

Figure 1:
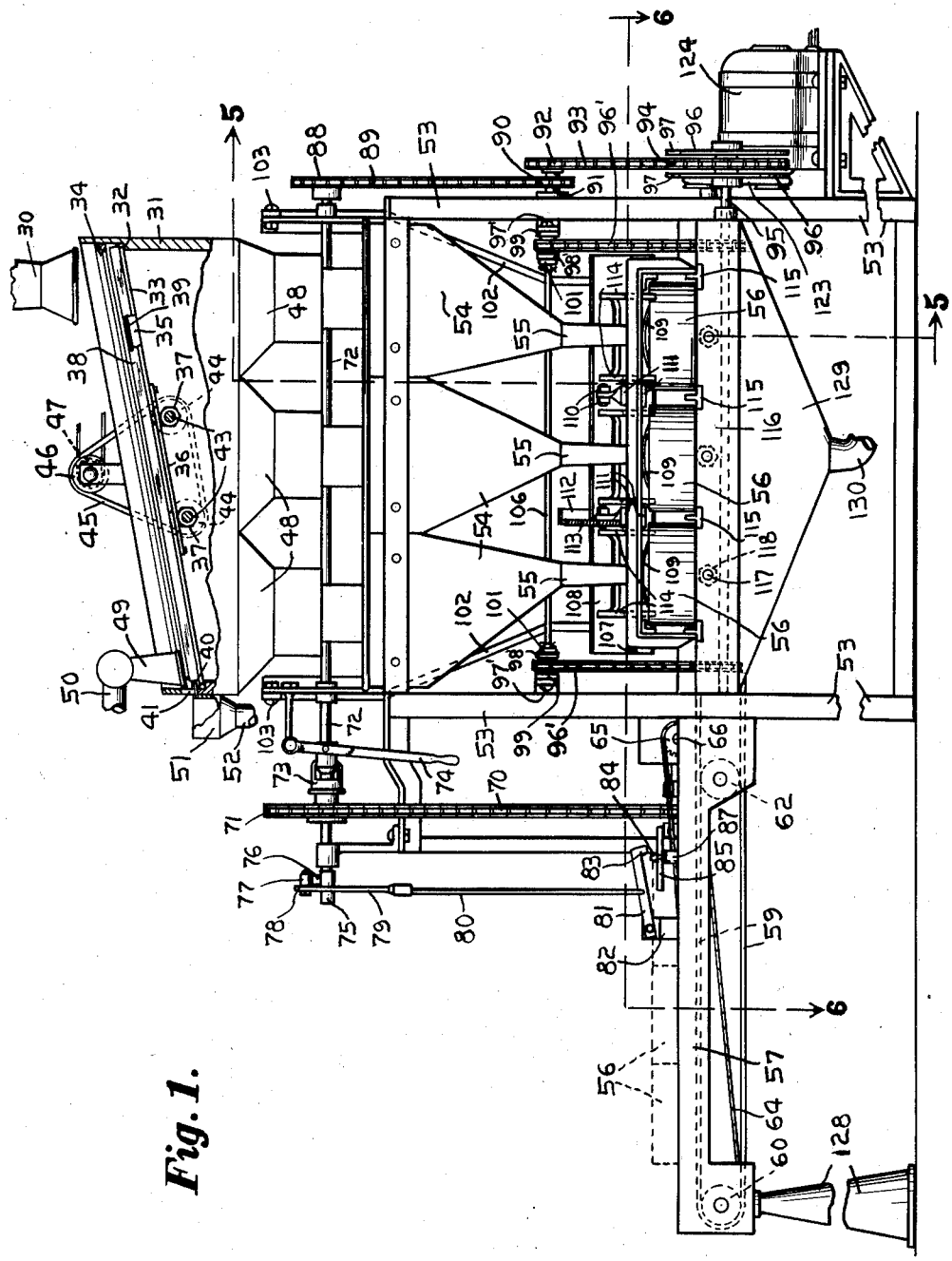
Figure 1 is side elevation of a coffee handling and canning machine constructed according to the present invention, certain parts being shown in section and broken away for the sake of clearness.

Referring now to the drawings, and first to Figures 1 and 20 to 24, 30 designates a spout through which ground coffee is adapted to be delivered. The spout 30 overhangs the upper end of a screen of separator of the gravity shaker type. The screen is supported in a housing 31 which may comprise a stationary portion of the machine and which is disposed at the top thereof. The housing 31 has a beveled or inclined upper edge portion which extends downwardly from a position beneath the spout 30, and the housing 31 is recessed at its inner wall and at its upper end to provide a ledge or shoulder 32 for supporting a screen frame 33. The screen frame 33 is of slightly less length than the distance between the upper and lower walls of the housing 31 so that the frame 33 is permitted a slight longitudinal movement during vibration. The frame 33 is retained by means of a cleat 34 from rising above a predetermined distance during the shaking action. The cleat 34 is secured about the inner wall of the housing 31.

As shown to advantage in Figures 21 and 23, the frame 33 comprises a rectangular structure provided with longitudinal spaced apart bars 35 which have secured to their under sides, and at their intermediate portions, wear strips 36 of metal, or the like, adapted to take up the impact and rubbing action of angularly faced vibrators 37 which are in the form of shafts extending transversely across the housing 31 beneath the screen frame 33, as shown in Figures 22 and 23.

The screen frame 33 is provided with a flanged rim 38 adapted to telescope to fit over the under side of the frame 33 and having an inwardly extending flange part to overlie the marginal edge portions of a flat screen 39. The screen 39 is in the form of a sheet which is of perforated or articulated construction with mesh or openings of the desired size to admit passage of coffee ground to a predetermined fineness. The flanged rim 38 is provided at its forward end with a recess or cut away portion 40 providing a slot through which the screen 39 may be slid into and out of place, and the front wall of the housing 31, as shown in Figure 22, is provided with a slot 41 through which the screen plate 39 may be slid without removing the screen frame 33 from the housing. A retaining screw 42 or the like, Figure 20, may be used for holding the screen plate 39 in the frame 33, the screw being radially removable by access from the top of the housing 31 so that the screens may be interchanged according to the fineness of the coffee to be canned.

The vibrators 37 may comprise angularly faced enlargements on a pair of transverse shafts 43, the enlargements being disposed in register with the wear strips 36. It is evident that any number of shafts 43 may be used, and any number of the vibrators 37 may be disposed upon the shafts.

Of course, the shafts 43 may be provided with enlargements which extend substantially throughout the length of the shafts, or any other suitable construction may be resorted to to provide the vibrators 37. The shafts 43 project through one side of the housing 31 and are provided with pulleys 44 over which pass a belt 45, the belt 45 extending upwardly in triangular formation and passing over a drive pulley 46 which has a sprocket 47 connected to its hub and which is adapted to be driven in any suitable manner for rotating the vibrator shafts 43. The corners or angular portions of the vibrators engage the wear strips 36 with an intermittent action so as to produce various more or less irregular blows against the under side of the screen frame to raise and shake the latter, and thus effect the spreading of the ground coffee over the screen plate 33 so that the finer particles may pass downwardly through the screen and through the housing 31 into a plurality of bins 48, or the like. The bins 48 are in suitable number, and are so proportioned as to cover the under side of the screen and to thus insure the entrapping of the screened coffee and also the more or less even distribution of the coffee throughout the various bins 48.

As shown to advantage in Figure 1, overhanging the lower end portion of the screen is a suction head 49 connected to a suitable duct 50, and the duct 50 is adapted to be connected with a suitable fan or other source of suction for lifting from the lower end of the screen chaff, or other foreign matter which is relatively light and which may be picked up and carried off from the screen. The coarser particles of coffee which do not pass through the screen 39, are finally delivered outwardly through the slot 41 in the housing 31 into a trough 51 which is provided with a pipe or duct 52 through which the coarser particles of coffee may be returned to a suitable grinder for regrinding and subsequent delivery to the screen through the spout 30.

The housing 31 is supported in any suitable manner, as for instance through the bin structure 48, above a frame 53 which is fixed and of any desired constructional configuration to accommodate the various parts of the machine and support them in their respective positions. The frame 53 carries in its upper portion a plurality of hoppers 54, three being shown in the present instance, and these hoppers are arranged in longitudinal alignment with respect to the length of the machine.

Each hopper has a reduced delivery spout 55, and these spouts are also arranged in longitudinal alignment and in suitably spaced relation for the reception of a can 56 or other suitable container, one beneath each spout. The capacity of the machine may be readily increased by increasing the number of the hoppers 54 so that the machine will accommodate the filling of any desired number of cans 56 at the same time. The bins 48 are arranged, preferably one above each hopper 54, and this construction admits of the use of any suitable measuring or weighing apparatus desired for controlling the passage of predetermined amounts of the ground coffee from the bins 48 into the hoppers 54. No particular construction is shown as the details thereof form no part of the present invention and such feeding and measuring devices are well known and numerous in the art.

Figures 3, 4:
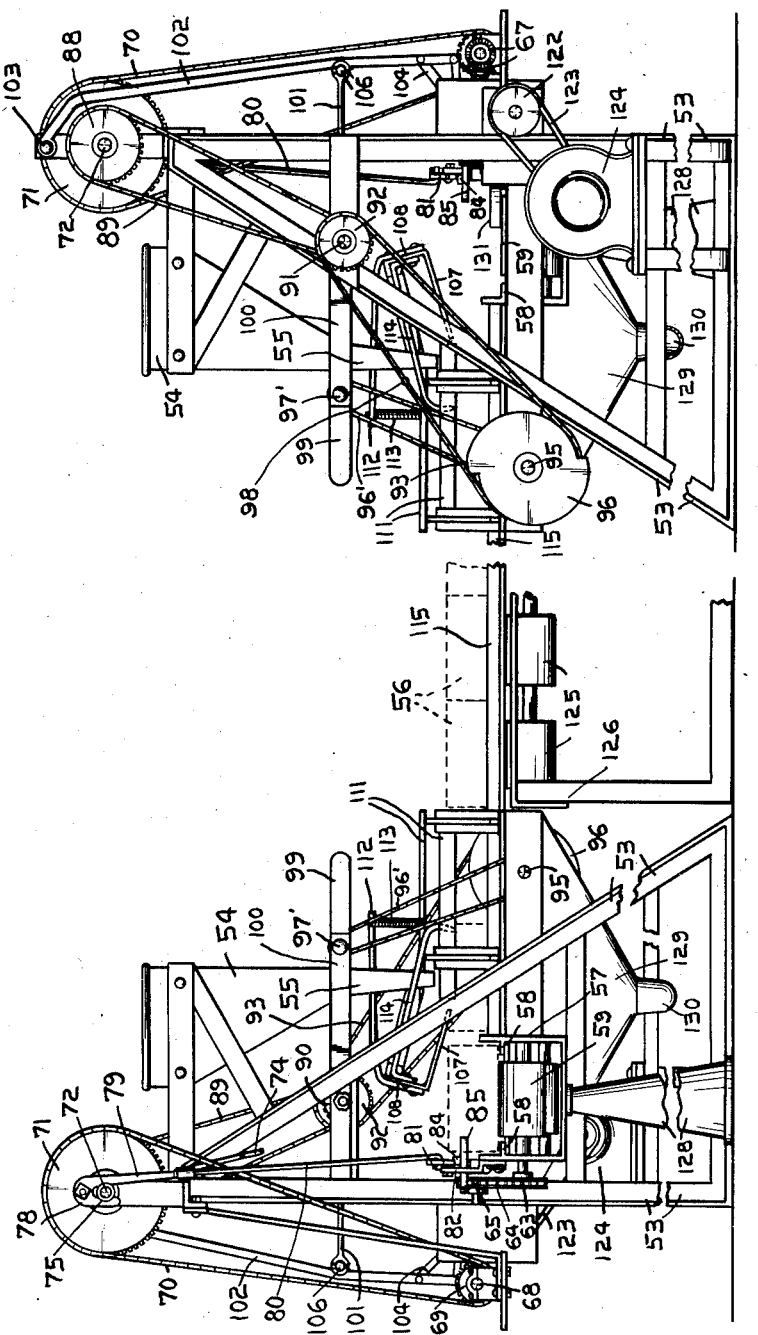
Figure 3 is a forward end elevation of the machine showing in dotted lines the cans in their various positions of feed through the machine.
Figure 4 is an opposite end elevation of the machine.
Figure 9:
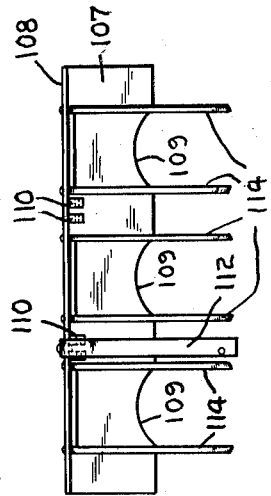
Figure 9 is a detail top plan view of the can holding device for positioning the can during filling.
Figure 10:
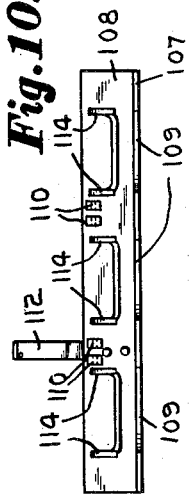
Fig. 10 is a front elevation of the same.

Disposed lengthwise along one side of the machine is a trackway 57. This trackway, as best shown in Figure 3, comprises an elongated boxing open at its top to receive therein the cans 56, the boxing having longitudinal flanges 58 in its opposite sides adapted to engage the bottoms of the cans 56 to support them, the flanges 58 being spaced downwardly from the upper edges of the boxing to leave guiding flanges to engage the opposite sides of the cans and hold them in line in the trackway.

The endless belt or conveyor 59 is disposed in the trackway 57 with its upper run substantially in the plane of the flange 58, and the belt 59 is adapted to engage a substantial lower surface portion of the can 56 so as to carry the can lengthwise in the trackway by the operation of the belt. The belt is supported at opposite ends upon rollers 60 and 61, and is also supported at suitable intermediate points upon rods or rollers 62 for holding the upper run of the belt in contact with the cans. The forward roller 60 constitutes the drive roller and has the shaft one end of which extends beyond the side of the trackway 57 and is provided with a sprocket 63 over which passes a sprocket chain 64. The sprocket chain 64 extends lengthwise of the trackway toward the intermediate portion of the machine and engages over a sprocket 65 mounted on a shaft 66 which extends alternately from the trackway 57 and is connected by beveled gears 67 to the shaft 68 suitably supported on the frame 53 at the bottom thereof and which carries a sprocket wheel 69 over which passes a sprocket chain 70, and the sprocket chain 70 is carried upwardly toward the top of the frame 53 and passes over a sprocket wheel 71 loosely mounted on the shaft 72 which extends in lengthwise direction across the top of the frame 53.

The sprocket wheel 71 is adapted to be driven by the shaft 72 through a clutch 73 under the control of a hand lever 74 which is pivoted upon the frame and which extends downwardly to be grasped by the operator for releasing and engaging the clutch 73. The shaft 72 extends beyond the sprocket wheel 71 and carries a hub 75 on one side of which is mounted a cam 76 which engages a roller 77 upon each revolution of the shaft 72. The roller 77 is secured to one side of a yoke 78 having a long arm 79 which extends downwardly and is detachably and adjustably connected to the upper end of a rod 80. The lower end of the rod 80 is pivoted upon a trip lever 81 which is pivoted at one end upon a bracket 82 which extends upwardly from one side of the trackway 57, and the free end of the trip lever 81 is provided with a nose 83 adapted to engage over a stop lug 84 mounted on the upper side of a star wheel 85. As shown in Figure 16, the star wheel 85 is provided with a spindle 86, and as shown in Figure 1 the spindle 86 is mounted in a support or bearing 87 arranged at one side of the trackway 57 so as to support the points of the star wheel 85 in the path of the cans 56. The star wheel is proportioned in size so as to dispose one point at a time at the forward edge of a can and the points are so spaced apart that they engage between the cans as the latter are advanced in a row along the trackway 57.

The nose 83 of the trip roller is adapted to hold the star wheel 85 from turning, and the lug 84 is so positioned on the star wheel as to maintain it against turning with one tooth projecting transversely over the side of the trackway 57 and into the path of the adjacent can 56. The belt or conveyor 59 is continuously driven and is adapted to slip beneath the row of cans 56 while the star wheel is locked against turning.

The forward end of the shaft 72 is provided with a sprocket wheel 88 over which passes a chain 89, and the latter is carried downwardly to a sprocket wheel 90 mounted on a shaft 91 disposed upon the forward end of the frame 53 and which carries a second sprocket wheel 92 over which passes a sprocket chain 93.

The sprocket chain 93 passes over a sprocket wheel 94, shown in Figures 18 and 19, and which is loosely mounted to turn upon a shaft 95 which extends longitudinally in the rear end of the machine. Fixed upon the shaft 95, and disposed in closely spaced relation to the opposite sides of the sprocket wheel 94 is a pair of ratchet wheels 96 which are provided with diametrically opposed ratchet teeth 97, and the corresponding teeth of the ratchets 96 are disposed in register with each other so that the ratchet wheels operate simultaneously.

The chain 93 is provided at one or more points with a ratchet bar 98 projecting at opposite ends from the opposite sides of the chain 93 and adapted to engage the shoulders 97 of the ratchet wheels 96 so as to impart a half turn to the shaft 95 each time the ratchet bar completes a cycle during the operation of the chain 93.

The shaft 95 is connected by chains 96' and their sprockets with a pair of co-axial crank shafts 97', one arranged at each end of the row of hoppers 54. Each crank shaft 97' is provided with a crank arm 98' and with a counter-balancing crank arm 99. Brackets 100 are supported on the frame 53 for supporting the crank shafts 97'. Each crank arm 98' is pivotally connected to a connecting rod 101 which extends across the trackway 57 within the upper part of the frame and is pivoted at its outer end to a sweep or can advancing device shown particularly in Figures 5, 12, 13 and 14.

The sweep comprises a pair of spaced apart arms 102 which are pivotally mounted at 103 at their upper ends to the top of the frame 53. The arms 102 extend downwardly and are connected by brackets 104 to a can engaging plate 105 which projects substantially at right angles inwardly from the lower ends of the arms 102 and which is recessed or serrated to provide independent seats for three or more cans against which the sweep is adapted to engage.

The plate 105 with its recesses is adapted to properly position the cans 56 during the sweeping action of the cans from the conveyor belt 59, and to advance the cans into position beneath the spouts 55 of the hoppers 54. The arms 102 are reinforced by cross bars 106 the ends of which project beyond the arms to provide mountings or pivotal connections for the connecting rods 101. The upper ends of the arms 102 are suitably curved or arched so as to best arrange the upper bars or portions of the stationary frame 53, as shown in Figure 5. The sweep thus has an amplitude of movement determined by the lengths of the cranks 98'.

Holding or retaining means is provided for the cans 56 when they are in proper position beneath the spouts 55. This means comprises a rocking member, shown to advantage in Figures 5, 9, 10 and 11. The retaining device embodies a plate 107 having an upstanding flange 108 at its inner edge and having at its forward edge recesses 109 conforming to the sides of the cans 56. The recesses 109 are spaced apart so as to center and hold the cans 56 beneath the spouts after the sweep has been retracted. The can retaining device is pivotally supported in position by means of pairs of lugs 110 which extend forwardly from the flange 108 in pairs, and each pair of lugs 110 is pivotally connected to the opposite sides of the adjacent top rail 111 of the can guides which extend from the trackway 57 across the lower ends of the spouts 55.

Figure 11:
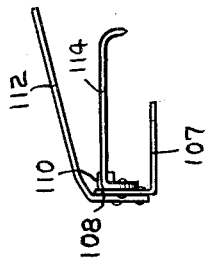
Figure 11 is a side view thereof.

The retaining device is normally held with its forward end depressed by means of an arm 112 which, as shown in Figure 11, is secured to the flange 108 and extends forwardly and upwardly therefrom. This arm 112 is connected to a spring 113, as shown in Figure 3, and the spring is anchored upon an adjacent top rail 111. The flange 108 of the can retaining device is also provided with pairs of retaining fingers 114 which are spaced above the plate 107 and which extend forwardly beyond the same and have their free ends curved downwardly and spaced apart distances sufficient to engage the forward side of the cans 56 and to thus prevent further forward movement thereof when the retaining device is tilted downwardly. The plate 107 normally lies in the path of the cans 56 as the latter are moved by the sweep from the conveyor belt 59 so that the pressure of the cans beneath the plate 107 tilts or swings the retaining device upwardly at its forward end to release the cans retained therein and admit of the movement of empty cans to the point of filling. It will be noted from Figure 5 that as the sweep receeds it moves from beneath the plate 107 so that the spring 113 may swing the retaining device downwardly into can locking position.

Figure 7:
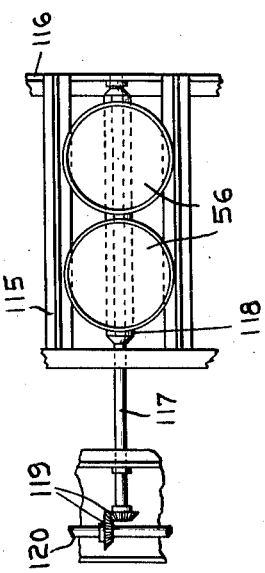
Figure 7 is a fragmentary top plan view of a trackway showing cans therein, and showing the agitating means for the cans.
Figure 8:
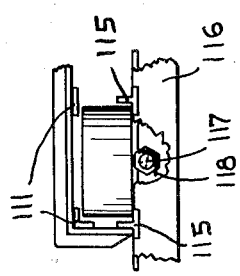
Figure 8 is a fragmentary outer end view of the same, the upper portion of the trackway being shown and the lower rail being broken away and showing the can agitator.

The cans 56 when moved by the sweep from the endless belt 59, advance into respective trackways which are arranged in proper position beneath the respective spouts 55, and which extend beyond the spouts so as to discharge the cans after they have been filled. As shown in Figures 7 and 8, each trackway comprises not only the top bars or rails 111, but also suitably shaped lower rails or bars 115 and these are supported upon cross pins 116 mounted in the frame 53. Beneath the central portion of each transverse trackway, there is disposed an agitator shaft 117 with an angularly faced vibrator 118 on each shaft adapted to engage at its corner or edge portions the bottoms of the cans 56 and vibrate the same, the transverse trackways having sufficient play with respect to the cans as to admit of the slight or limited vibration thereof. The vibration of the cans during filling insures the settling of the ground coffee therein and the complete filling of the cans without danger of spilling the coffee. The cans may thus be filled substantially level or flush with its upper end. The agitating shafts 117 extend outwardly toward the side of the machine within the runs of the conveyor belt 59 and are connected by beveled gears 119 with a longitudinal shaft 120 which extends along the side of the machine and has one end connected by a worm and worm wheel 121 to the shaft 66 for driving the latter and the various train of devices connected thereto, and through the clutch 73.

The rear end of the shaft 120 is provided with a pulley wheel 122 over which passes a belt 123 which leads to the shaft of a motor 124 of any suitable type for supplying the operating power of the machine.

Figure 2:
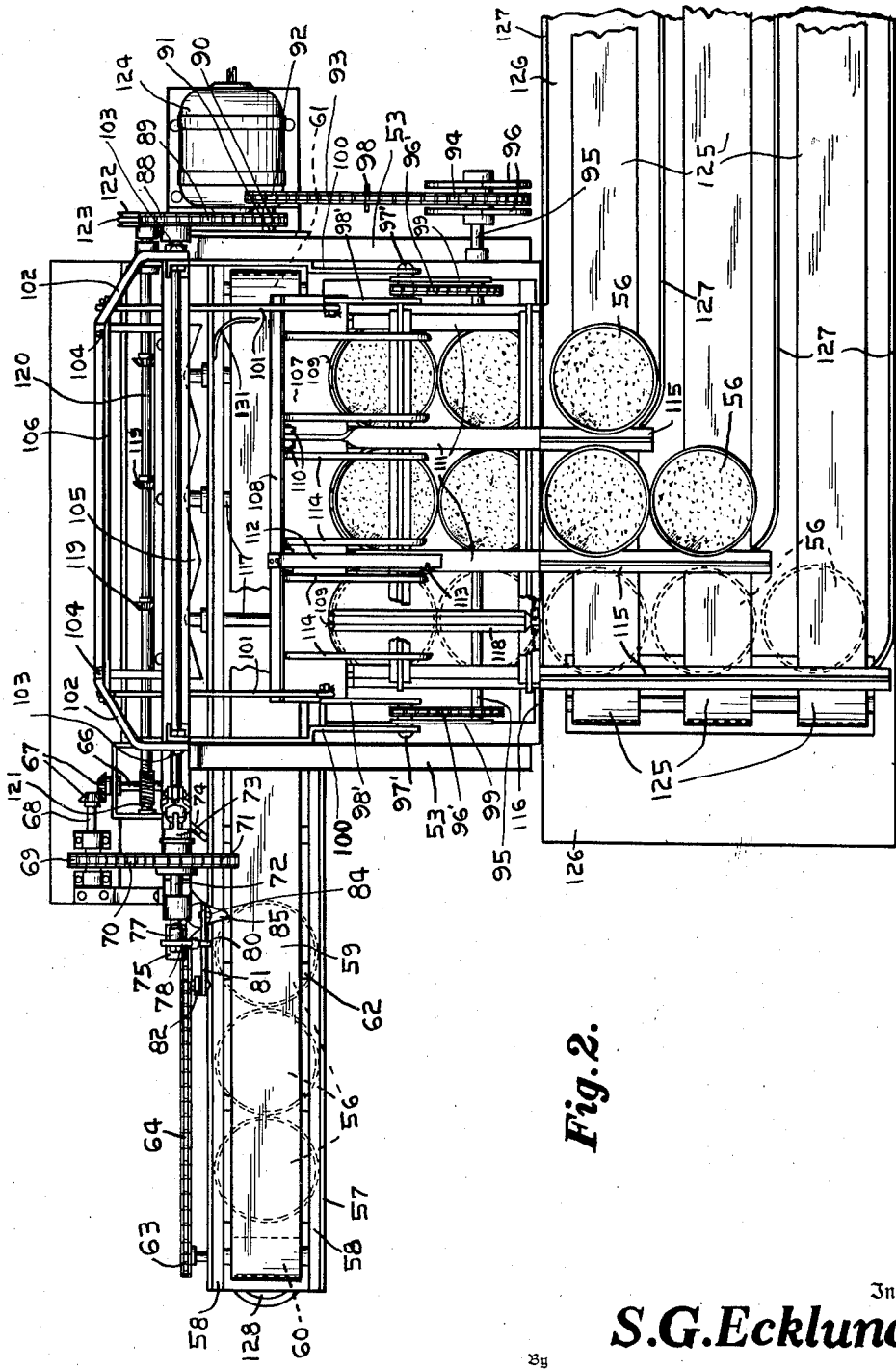
Figure 2 is a top plan view of the machine with the screen removed.

As shown in Figures 2, 3, and 6 particularly, the top rails 111 of the transverse trackways or guides terminate at the outer side of the frame 53, or extend a distance from the line of the spout 55 sufficient to support a single row of the filled cans 56. The lower rails 115 of the transverse trackways, however, extend outwardly beyond the upper rails and terminate in suitable stepped relation from the rear end of the machine forwardly so that the innermost or forward rail 115 is the longest, and it extends over the upper runs of a plurality of delivery belts 125. These belts 125 are spaced apart and are suitably mounted over a table or support 126, and the belts 125 extend lengthwise of the machine so as to carry the filled cans from the rear end thereof. It will be noted that as the rails 115 are disposed in stepped relation, the differences in lengths between adjacent rails equal substantially to the width of a can 56 so that the cans are released one at a time from each transverse trackway and upon their respective belts 125. The rearmost trackway is the shortest and delivers the filled cans one at a time to the adjacent belt 125.

Guide rails 127 are disposed at the outer ends of the respective lower rails 115 of the trackways so as to guide the cans in the proper position upon their respective belts. The belts 125 are adapted to be continuously operated so as to pick up and carry off the cans as they are forced or delivered outwardly from their trackways and to thus admit of the continuous uninterrupted passage of the cans through the machine. The forward end of the longitudinal trackway 57 may be supported in any suitable manner such as by means of a pillar or post 128, and the frame 53 is provided with suitable arms, the bracket extensions and the like for supporting the various parts in their relative positions as above set forth.

Disposed in the bottom of the frame 53 is a hopper 129 which may be disposed beneath the spouts 55 and the transverse trackways or guides so that should any of the ground coffee be accidently discharged from the spouts when the cans are not in correct position, or any of the coffee spilled from the cans by faulty operation of the machine, such coffee may be collected in the hopper 129 and discharged therefrom through a pipe 130 for repassage through the machine.

At the inner end of the main trackway 57 there is disposed a curved stop arm 131 which, as shown in Figure 6, is adapted to engage the innermost can and arrest the feeding movement of the row of cans as they are advanced by the conveyor 59. The stop arm 131 thus holds the cans in position to be engaged by the sweep, and substantially in register with the transverse trackways which extend beneath the filling spouts.

In the operation of the machine, ground coffee is delivered through the spout 30 to the upper end of the screen or separator, and by operation of the vibrators 37, the ground coffee is spread over the upper surface of the screen 39 and is sifted through the screen, the chaff or other light particles or foreign substances in the coffee being drawn off from the lower end of the screen through the suction head 49. The larger particles of ground coffee pass out through the slot 41 in front of the housing 31, are caught in the trough 51 and carried through the pipe 52 back to a grinding machine to be again delivered through the spout 30 to the screen.

The ground coffee passing through the screen 39 is deposited in the bins 48, and through any suitable valve or measuring mechanism, is deposited at times into the hoppers 54 and is discharged therefrom through the spouts 55.

During the above operations, the shaft 120 is driven by the motor 124, and through the worm and worm wheel connection 121 operates the shaft 66 which not only drives the conveyor 59, but also turns the shaft 72. Empty cans are deposited, as shown in dotted lines in Figure 1, in the trackway 57 upon the belt or conveyor 59.

The continuous operation of the belt moves the cans 56 toward the star wheel 85 and as the latter is locked against turning by means of the lever 81 and the stop lug 84 on the star wheel, the cans 56 are held from advancement into the machine in a row within the trackway 57. At each revolution of the shaft 72, the cam 76 engages the roller 77 and raises it together with the yoke 78 so as to swing the stop lever 81 upwardly and release the star wheel 85. The row of cans 56 is now carried forwardly into the machine, the star wheel 85 having a complete revolution before the stop 84 thereof again engages the nose 83 of the stop lever 81. The arms of the star wheel engage between the cans so as to determine the size thereof and to admit but three cans, according to the present construction of the machine. Of course, the machine may be constructed to take care of more or less cans as desired. The cans 56 advance within the machine until the innermost can engages the stop arm 131. The row of cans is thus held, the belt 59 sliding beneath the cans. The cans being empty, no appreciable wear is had on the surface of the belt.

The shaft 72 operates, through the chain 89, the shaft 91 with its sprocket wheels 90 and 92, and through them the chain 93 which carries the ratchet bar 98. As above explained, each time the ratchet bar 98 engages the ratchet wheels 96, the shaft 95 is turned and the chains 96' operate the crank shafts 97 and through the connecting rods 101 bring the sweep 105 into engagement with the run of empty cans, and force the empty cans out of the longitudinal trackway into their respective transverse trackways. The sweep, as shown to advantage in Figure 5, moves the cans into position beneath the retaining device. The plate 107 of the retaining device slides over the top of the cans and the retaining fingers 114 are raised into the position shown in dotted lines in Figure 5 to free any cans which have been filled. As soon as the cans 56 are in position beneath the spouts 55, the sweep returns to normal position and releases the retaining device so that the fingers 114 drop down in front of the cans to hold them from further advancement, and the plate 107 drops down against the rear sides of the cans and holds them in proper position, the cans being seated in the recess 109 of the plate. As the cans 56 are moved into position beneath the spouts 55, they are also slid into position over the vibrating device 118.

These devices are continuously operated directly from the shaft 120 so that the can is vibrated during the filling operation so as to settle the ground coffee in the cans to not only level the coffee but to insure the proper and compact packaging of the coffee therein. It will be noted that the transverse trackways are of such dimensions as to admit of the slight vibration or movement of the can under impact of the vibrators 118.

As soon as the sweep returns to normal position, another run of empty cans is released by the star wheel 85 and is carried by the endless conveyor 59 into line with the transverse trackways. By the time the second run of cans is disposed opposite the sweep, the first run of cans has been filled. The sweep is now brought into operation to advance the run of empty cans against the run of filled cans and, as shown to advantage in Figure 2, pushes the filled cans outwardly from beneath the spouts 55. The retaining means is released from the filled cans by the forward edges of the empty cans which are cammed beneath the plate 107 of the retaining device so as to swing the latter upwardly against tension of the spring 113.

The consecutive advancement of the cans after filling brings the same to the outer ends of the trackways where they are deposited upon the belts 125 and are carried on these belts to any suitable point for sealing, or other disposement.

It is obvious that various changes and modifications may be made in the details of construction and design of the above specifically described embodiment of this invention without departing from the spirit thereof, such changes and modifications being restricted only by the scope of the following claims:

What is claimed is:

1. In a coffee canning machine, parallel trackways, a support for cans at the inner ends of the trackways, a pivoted sweep, a crank having crank arms connected to said sweep, a shaft connected to said crank arms and having ratchet wheels thereon, a sprocket wheel arranged between the ratchet wheels on said shaft, an operating chain engaging over said sprocket wheel and having a ratchet bar adapted upon each cycle of movement of the chain to engage said ratchet wheels and turn the shaft to operate the crank arms to swing the sweep toward and from the trackways, said sweep adapted to advance empty cans into the trackways, pivoted retaining means having cam portions adapted to engage the forward sides of the cans for receiving the same therebeneath, means for filling the cans when engaged by said retaining means, and means for vibrating the cans during filling.

2. In a coffee canning machine, means for supporting a row of empty cans, a plurality of parallel trackways at one side of said supporting means, a sweep operable across said supporting means for engaging the cans and advancing the same into said trackway, a pivoted retaining device having outwardly projecting downturned fingers adapted to engage the outer sides of the cans delivered by the sweep and having a cam plate beneath said fingers adapted to engage the rear sides of said cans for holding the cans against shifting in the trackways, means for filling the cans when engaged by said retaining means, the cam plate of said retaining means adapted to receive the forward edges of a second row of cans therebeneath under action of the sweep for raising the retaining means and advancing the filled cans toward the outer ends of the trackways during the positioning of the second row of cans.

3. In a coffee canning machine, parallel trackways, a support for cans at the inner ends of the trackways, a pivoted sweep, a crank having crank arms connected to said sweep, a shaft connected to said crank arms and having ratchet wheels thereon, a sprocket wheel arranged between the ratchet wheels on said shaft, an operating chain engaging over said sprocket wheel and having a ratchet bar adapted upon each cycle of movement of the chain to engage said ratchet wheels and turn the shaft to operate the crank arms to swing the sweep toward and from the trackways, said sweep adapted to advance empty cans into the trackways, pivoted retaining means having cam portions adapted to engage the forward sides of the cans for receiving the same therebeneath, means for filling the cans when engaged by said retaining means, and an elongated rotating non-circular member having continuous angular shoulders adapted to project upwardly through the support for intermittently striking against the cans to vibrate the latter and settle the coffee therein during filling.

4. In a coffee canning machine, a longitudinal trackway adapted to receive empty cans, holding means cooperating with the trackway for holding the cans in a row means on said trackway, a plurality of transverse trackways at the inner end of the longitudinal trackway, operating means to release the trip means and admit movement of a predetermined number of cans into alignment with the transverse trackways, a sweep for engaging the cans and advancing the same into the transverse trackways, retaining means for engaging the cans when advanced to hold the same loosely from advancement in the transverse trackways, feed hoppers arranged above the transverse trackways to supply ground coffee to the cans when engaged by the retaining means, vibrating means disposed beneath the transverse trackways and engaging the cans to vibrate the same during filling, said transverse trackways terminating in stepped relation at their outer ends, and a plurality of endless belts arranged across the outer ends of the transverse trackways to receive the cans therefrom for carrying off the cans after filling.

SIXTEN G. ECKLUND.